US010773246B2

(12) United States Patent
O'Hare et al.

(10) Patent No.: US 10,773,246 B2
(45) Date of Patent: Sep. 15, 2020

(54) $SIO_2$-LAYERED DOUBLE HYDROXIDE MICROSPHERES AND METHODS OF MAKING THEM

(71) Applicant: SCG CHEMICALS CO., LTD., Bangsue Bangkok (TH)

(72) Inventors: Dermot O'Hare, Oxford (GB); Chunping Chen, Oxford (GB)

(73) Assignee: SCG CHEMICALS CO., LTD., Bangsue Bangkok (TH)

( * ) Notice: Subject to any disclaimer, the term of this patent is extended or adjusted under 35 U.S.C. 154(b) by 0 days.

(21) Appl. No.: 15/541,655

(22) PCT Filed: Jan. 6, 2016

(86) PCT No.: PCT/GB2016/050024
§ 371 (c)(1),
(2) Date: Jul. 5, 2017

(87) PCT Pub. No.: WO2016/110698
PCT Pub. Date: Jul. 14, 2016

(65) Prior Publication Data
US 2018/0264444 A1     Sep. 20, 2018

(30) Foreign Application Priority Data
Jan. 6, 2015   (GB) .................... 1500115.9

(51) Int. Cl.
*C08F 10/02*     (2006.01)
*B01J 27/236*    (2006.01)
(Continued)

(52) U.S. Cl.
CPC ............. *B01J 27/236* (2013.01); *B01J 21/08* (2013.01); *B01J 35/0006* (2013.01);
(Continued)

(58) Field of Classification Search
CPC .... B01J 21/08; B01J 31/1608; B01J 31/1616; B01J 37/035; B01J 37/06; B01J 37/343;
(Continued)

(56) References Cited

U.S. PATENT DOCUMENTS 5,672,668 A   9/1997   Winter et al.
5,696,045 A   12/1997  Winter et al.
(Continued)

FOREIGN PATENT DOCUMENTS

CA   2133181   3/1995
CA   2133389   4/1995
(Continued)

OTHER PUBLICATIONS

Chen (A facile synthesis of monodispersed hierarchical layered double hydroxide on silica spheres for efficient removal of pharmaceuticals from water, Journal of Materials Chemistry A (2013), vol. 1, p. 3877-3880 and supplemental information).*
(Continued)

*Primary Examiner* — Jun Li
(74) *Attorney, Agent, or Firm* — Barnes & Thornburg LLP

(57) ABSTRACT

A method of making silica-layered double hydroxide microspheres having the formula I: (i) wherein, $M^{z+}$ and $M^{y+}$ are two different charged metal cations; z=1 or 2; y=3 or 4; 0<x<0.9; b is 0 to 10; c is 0 to 10; P>0, q>0, $X^{n-}$ is an anion; with n>0 a=z(1−x)+xy−2; and the AMO-solvent is an 100% aqueous miscible organic solvent; comprises the steps: (a) contacting silica microspheres and a metal ion containing solution containing metal ions $M^{z+}$ and $M^{y+}$ in the presence of a base and an anion solution; (b) collecting the product; and (c) optionally treating the product with AMO-solvent and recovering the solvent treated material to obtain the silica-layered double hydroxide microspheres. Preferably, M
(Continued)

Figure 1:
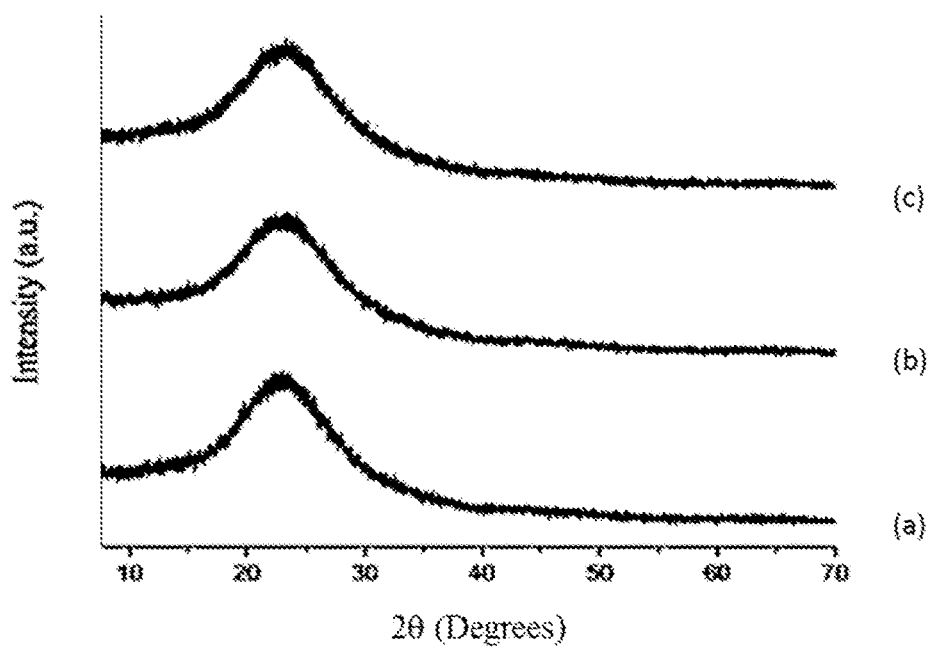

in the formula I is Li, Mg, Ni or Ca. Preferably, M' in formula I is Al. The invention further provides silica-layered double hydroxide microspheres having the formula I. The silica-layered double hydroxide microspheres may be used as catalysts and/or catalyst supports.

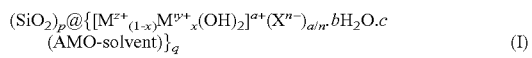

(I)

14 Claims, 11 Drawing Sheets

(51) Int. Cl.
C09C 1/30 (2006.01)
C01B 33/18 (2006.01)
C01F 7/00 (2006.01)
B01J 21/08 (2006.01)
B01J 35/00 (2006.01)
B01J 35/08 (2006.01)
B01J 35/10 (2006.01)
B01J 37/02 (2006.01)

(52) U.S. Cl.
CPC .......... *B01J 35/0086* (2013.01); *B01J 35/08* (2013.01); *B01J 35/1019* (2013.01); *B01J 37/0221* (2013.01); *C01B 33/18* (2013.01); *C01F 7/005* (2013.01); *C09C 1/3054* (2013.01); *C01F 7/004* (2013.01); *C01P 2002/72* (2013.01); *C01P 2002/86* (2013.01); *C01P 2002/88* (2013.01); *C01P 2004/03* (2013.01); *C01P 2004/04* (2013.01); *C01P 2004/32* (2013.01); *C01P 2004/34* (2013.01); *C01P 2004/62* (2013.01); *C01P 2004/80* (2013.01); *C01P 2004/84* (2013.01); *C01P 2006/12* (2013.01)

(58) Field of Classification Search
CPC ......... B01J 20/103; C01F 7/004; C01F 7/005; C01B 33/12; C01P 2004/84
See application file for complete search history.

(56) References Cited

U.S. PATENT DOCUMENTS

| | | | |
|---|---|---|---|
| 5,892,081 | A | 4/1999 | Sueling et al. |
| 5,939,346 | A | 8/1999 | Marks et al. |
| 5,962,714 | A | 10/1999 | McCullough |
| 6,197,985 | B1 | 3/2001 | Kobata et al. |
| 6,268,444 | B1 | 7/2001 | Klosin et al. |
| 6,469,188 | B1 | 10/2002 | Miller et al. |
| 6,509,405 | B1* | 1/2003 | Kobayashi ............ C01F 7/005 524/436 |
| 6,552,210 | B1 | 4/2003 | Gores et al. |
| 6,583,238 | B1 | 6/2003 | Gores et al. |
| 6,664,208 | B1 | 12/2003 | Fujita et al. |
| 6,696,379 | B1 | 2/2004 | Carnahan et al. |
| 6,833,945 | B2 | 12/2004 | Tokita et al. |
| 8,404,880 | B2 | 3/2013 | Kaji et al. |
| 8,980,781 | B2 | 3/2015 | O'Hare et al. |
| 9,340,630 | B2 | 5/2016 | Kaji et al. |
| 9,676,879 | B2 | 6/2017 | Tsurugi et al. |
| 9,884,925 | B2 | 2/2018 | O'Hare et al. |
| 10,065,172 | B2* | 9/2018 | O'Hare ................ C01F 7/005 |
| 2002/0039962 | A1 | 4/2002 | Schaverien et al. |
| 2003/0176275 | A1 | 9/2003 | Volker et al. |
| 2005/0182266 | A1 | 8/2005 | Schulte et al. |
| 2005/0197471 | A1 | 9/2005 | Fujita et al. |
| 2006/0223960 | A1 | 10/2006 | Jaber et al. |
| 2007/0105712 | A1 | 5/2007 | Panitzky et al. |
| 2007/0185251 | A1* | 8/2007 | Kobayashi ............ C01F 7/005 524/444 |
| 2007/0232483 | A1 | 10/2007 | Yang et al. |
| 2008/0021115 | A1* | 1/2008 | Ikematsu ................ A61K 8/26 514/769 |
| 2008/0249255 | A1 | 10/2008 | Asandei |
| 2009/0137755 | A1 | 5/2009 | Yamada et al. |
| 2011/0136994 | A1 | 6/2011 | Ochi et al. |
| 2011/0282017 | A1 | 11/2011 | Kaji et al. |
| 2012/0070573 | A1* | 3/2012 | Kobayashi ............ C01F 7/005 427/215 |
| 2012/0271016 | A1 | 10/2012 | O'Hare et al. |
| 2013/0059990 | A1 | 5/2013 | Kaji et al. |
| 2015/0057418 | A1 | 2/2015 | Kaji et al. |
| 2015/0119539 | A1 | 4/2015 | McCullough |
| 2015/0376306 | A1 | 12/2015 | Tsurugi et al. |
| 2017/0029537 | A1 | 2/2017 | O'Hare et al. |
| 2017/0306064 | A1 | 10/2017 | O'Hare et al. |
| 2017/0313793 | A1 | 11/2017 | O'Hare et al. |
| 2017/0320972 | A1 | 11/2017 | O'Hare et al. |
| 2018/0022839 | A1 | 1/2018 | O'Hare et al. |
| 2018/0264444 | A1 | 9/2018 | O'Hare et al. |

FOREIGN PATENT DOCUMENTS

| | | | |
|---|---|---|---|
| CN | 102294209 | | 12/2011 |
| CN | 102294209 | A | 12/2011 |
| CN | 103525363 | | 1/2014 |
| EP | 0645401 | | 9/1994 |
| EP | 0704461 | | 4/1996 |
| EP | 0707016 | | 4/1996 |
| EP | 0646604 | | 9/1997 |
| EP | 1055673 | | 11/2000 |
| EP | 2570437 | | 3/2013 |
| EP | 2706040 | | 3/2014 |
| JP | 05125223 | | 5/1993 |
| JP | 2001266522 | A | 2/2000 |
| JP | 2002159849 | A | 6/2002 |
| JP | 3795072 | | 7/2006 |
| JP | 2010-043152 | A | 2/2010 |
| JP | 2010-202791 | A | 9/2010 |
| JP | 2014118550 | | 6/2014 |
| WO | WO1991/009881 | | 7/1991 |
| WO | 1995/014024 | | 5/1995 |
| WO | 1997/015583 | | 5/1997 |
| WO | 1998/006728 | | 2/1998 |
| WO | WO-9822388 | A1* | 5/1998 ............ C01F 7/02 |
| WO | WO1998/043989 | | 10/1998 |
| WO | WO1998/046616 | | 10/1998 |
| WO | 1998/049211 | | 11/1998 |
| WO | WO2000/026266 | | 5/2000 |
| WO | WO 2001/090205 | | 11/2001 |
| WO | WO 2003/033545 | | 4/2003 |
| WO | 2003/037941 | | 8/2003 |
| WO | WO2006/117285 | | 11/2006 |
| WO | WO2009/077115 | | 6/2009 |
| WO | WO2011/051705 | | 5/2011 |
| WO | WO 2010/055652 | | 4/2012 |
| WO | WO2012/048091 | | 4/2012 |
| WO | WO2013/146337 | | 10/2013 |
| WO | WO2014/051529 | | 4/2014 |
| WO | WO 2015/155214 | | 10/2015 |
| WO | WO2015/159073 | | 10/2015 |
| WO | WO 2016/075485 | | 5/2016 |
| WO | WO2016/075486 | | 5/2016 |
| WO | WO2016/075488 | | 5/2016 |
| WO | WO2016/110699 | | 7/2016 |

OTHER PUBLICATIONS

Licht, E. H. et al., "Synthesis and characterization of bis(cyclopentadienyl)zirconium dichloride complexes with ω-fluorenylallcyl or silyl substituents and their application in catalytic ethylene polymerization," Journal of Molecular Catalysis A Chemica, 2000, 164, 9-23.
PCT International Search Report and Written Opinion prepared for PCT/GB2015/053456, dated Feb. 29, 2016, 13 pages.
PCT International Search Report and Written Opinion prepared for PCT/GB2015/053457, dated Feb. 5, 2016, 12 pages.

(56) References Cited

OTHER PUBLICATIONS

PCT International Search Report and Written Opinion prepared for PCT/GB2015/053459, dated Feb. 11, 2016, 9 pages.
PCT International Search Report and Written Opinion prepared for PCT/GB2010/0051791, dated Feb. 7, 2011, 9 pages.
PCT International Search Report and Written Opinion prepared for PCT/GB2015/051137, completed Jul. 16, 2015, 8 pages.
PCT International Search Report and Written Opinion prepared for PCT/GB2016/050024, dated Apr. 26, 2016, 10 pages.
Ransom, P. et al., "Synthesis, Characterization, and Polymerization Studies of Ethylenebis(hexamethylindenyl) Complexes of Zirconium and Hafnium," Organometallics, 2011, 30, 800-814.
Chen, C. et al, "Tuneable ultra high specific surface area Mg/Al—CO 3 layered double hydroxides," Dalton Transactions: The International Journal for Inorganic, Organometallic and Bioinorganic Chemistry, 2015, 44, 16392-16398.
Buffet, J. et al, "Metallocene supported core@LDH catalysts for slurry phase ethylene polymerization," Chem. Communications, 2016, 52, 4076-4079.
Gauthier, W. J. et al., "Elastomeric poly(propylene): Influence of catalyst structure and polymerization conditions on polymer structure and properties," Macromolecules, 1995, 28, 3771-3778.
Silveira, et al., "Metallocenes in ethylene polymerization studied by cyclic and differential pulse voltammetry," Appl. Catal. A: General, 2008, 344, 98-106.
Alias, F. M. et al., "Synthesis, Characterisation and Structure of a Strained Ring-Tilted Bis(indenyl) iron Complex," Journal of Organometallic Chemistry, 1997, 528, 47-58.
PCT International Search Report and Written Opinion prepared for PCT/GB2016/050025, dated May 7, 2016, 12 pages.
UK Search Report prepared for GB1500115.9, dated Jun. 24, 2015, 3 pages.
Angpanitcharoen, P. et al., "Supported bis(peralykylindenyl)metallocene Catalysts for Slurry Phase Ethylene Polymerisation," Polyhedron, 2016, 116, 216-222.
Arnold, T. et al., "Polymethylaluminoxane Supported Zirconocene Catalysts for Polymerisation of Ethylene," Journal of Organometallic Chemistry, 2016, 822, 85-90.
Arnold, T. et al., "Synthesis, Characterisation, and Polymerisation Studies of Hexamethylindenyl Zirconocenes and Hafnocenes," Journal of Organometallic Chemistry, 2015, 792, 55-65.
Betteridge, P.W. et al., "CRYSTALS Version 12: Software for Guided Crystal Structure Analysis," J. Appl. Crystal., 2013, 36, 1487.
Buffet, J.C. et al., "Synthesis and Characterisation of Permethylindenyl Zirconium Complexes and Their Use in Ethylene Polymerisation," RSC Adv., 2015, 5, 87456-87464.
Buffet, J.C. et al., "Core Shell@LDH Supported Catalysts for Ethylene Polymerisation," Presentation May 29, 2017.
Buffet, Jean-Charles, "Core Shell@LDH Solid Catalysts for Polymerisation," Presentation Jul. 18, 2016.
Buffet, J.C. et al., "Popcorn Shaped Polyethylene Using Polymethylaluminoxane Solid Catalysts," Poster, presented Apr. 10, 2017.
Buffet, J.C. et al., "Popcorn Shaped Polyethylene Using Polymethylaluminoxane Solid Catalysts," Poster, presented Sep. 14, 201T.
Cao, Y. et al., "DNA-Modified Core-Shell Ag/Au Nanoparticles," J. Am. Chem. Soc., 2001, 123, 7961-7962.
Chen, C. et al., "Core-shell SiO2@LDHs with Tuneable Size, Composition and Morphology," Chem. Commun., 2015, 51, 3462-3465.
Chen, C. et al., "Core-shell zeolite@aqueous Miscible Organic-Layered Double Hydroxides," Chem. Sci., 2016, 7, 1457-1461.
Cooper, R. I., et al., "CRYSTALS Enhancements: Dealing with Hydrogen Atoms in Refinement," J. Appl. Cryst., 2010, 43, 1100-1107.
Cosier, J., et al., "A Nitrogen-Gas-Stream Cryostat for General X-ray Diffraction Studies," J. Appl. Cryst., 1986, 19, 105-107.
Lamb, J., "Synthesis of Asymmetric Zirconocenes for Ethylene Polymerisation Catalysis," Presentation for Dalton Younger Members Event, Sep. 7, 2017.
Otwinowski, W. et al., "Processing of X-Ray Diffraction Data Collected in Oscillation Mode," Methods in Enzymology, 2007, vol. 276, 307-326.
Palatinus, L. et al., "Superflip—A Computer Program for the Solution of Crystal Structures by Charge Flipping in Arbitrary Dimensions," J. Appl. Crystal., 2007, 40, 786-790.
Shao, M. et al., "Core-Shell Layered Double Hydroxide Microspheres with Tunable Interior Architecture for Supercapacitors," Chem. Mater., 2012, 24, 1192-1197.
Teng, X. et al., "Platinum-Maghemite Core-Shell Nanoparticles Using a Sequential Synthesis," Am. Chem. Soc., 2003, Nano Letters, vol. 3, No. 2, 261-264.
Buffet, Jean-Charles et al., "Group 4 metal initiators for the controlled stereoselective polymerization of lactide monomers," *Chem. Commun.*, 2011, 47, 4796-4798.
Buffet, Jean-Charles et al., "Zirconocene alkoxides and aryloxides for the polymerization of L- and rac-lactide," Journal of Organometallic Chemistry 801 (2016) 87-95. Published online Oct. 23, 2015.
Hayakawa, Michiya et al., "Living ring-opening polymerization of lactones using cationic zirconocene complex catalysts," *Macromol. Chem. Phys.* 198, 1305-1317 (1997).
Hayakawa, Michiya et al., "Living ring-opening polymerization of cyclic carbonate using cationic zirconocene complex as catalyst," *Macromol. Rapid Commun.* 17, 865-870 (1996).
Ning, Yalan et al., "Neutral Metallocene Ester Enolate and Non-Metallocene Alkoxy Complexes of Zirconium for Catalytic Ring-Opening Polymerization of Cyclic Esters," Organometallics 2008, 27, 5632-5640.
PCT International Search Report and Written Opinion prepared for PCT/GB2017/051257, dated Jul. 17, 2017, 12 pages.
PCT International Search Report and Written Opinion prepared for PCT/GB2017/051305, dated Aug. 2, 2017, 11 pages.
Ren, Wenshan et al., "Synthesis, structure, and catalytic activity of benzyl thorium metallocenes," Inorganic Chemistry Communications 30 (2013) 26-28. Published online Jan. 31, 2013.
Turner, Zoe R. et al., "Chiral Group 4 Cyclopentadienyl Complexes and Their Use in Polymerization of Lactide Monomers," Organometallics 2014, 33, 3891-3903.
UK Search Report prepared for Application No. GB1607989.9, dated Nov. 9, 2016, 5 pages.
UK Search Report prepared for Application No. GB1607989.9, dated Mar. 29, 2017, 2 pages.
UK Search Report prepared for Application No. GB1608384.2, dated Feb. 17, 2017, 4 pages.
Klosin et al., "Development of Group IV Molecular Catalysts for High temperature Ethylene-a-Olefin Copolymerization Reactions" Am Chem. Res. 2015, 48, 2004-2016.
Takeuchi et al., "Transition metal compounds, olefin polymerization catalysts, and processes for producing olefin polymers using the catalysts", XP002772081, retrieved from STN, Database accession No. 1995:960184.

* cited by examiner

SIO₂-LAYERED DOUBLE HYDROXIDE MICROSPHERES AND METHODS OF MAKING THEM

CROSS-REFERENCE TO RELATED APPLICATIONS

This application is a national stage entry under 35 USC § 371 of PCT International Application Number PCT/GB2016/050024, filed Jan. 6, 2016, which claims priority to United Kingdom Patent Application Number 1500115.9, filed Jan. 6, 2015, the entire disclosures of which are expressly incorporated by reference herein.

The present invention relates to new $SiO_2$-layered double hydroxide (LDH) microspheres and to methods of making the same.

Layered double hydroxides (LDHs) are a class of compounds which comprise two or more metal cations and have a layered structure. A review of LDHs is provided in *Structure and Bonding*; Vol. 119, 2005 *Layered Double Hydroxides* ed. X Duan and D. G. Evans. The hydrotalcites, perhaps the most well-known examples of LDHs, have been studied for many years. LDHs can intercalate anions between the layers of the structure.

Core shell particles are described in the literature by "core@shell" (for example by Teng et al., Nano Letters, 2003, 3, 261-264, or by "core/shell" (for example J. Am. Chem Soc., 2001, 123, pages 7961-7962). We have adopted the "core@shell" nomenclature as it is emerging as the more commonly accepted abbreviation.

$SiO_2$/LDH core-shell microspheres are described by Shao et al, Chem. Mater. 2012, 24, pages 1192-1197. Prior to treatment with a metal precursor solution, the $SiO_2$ microspheres are primed by dispersing them in an Al(OOH) primer sol for two hours with vigorous agitation followed by centrifuging, washing with ethanol and drying in air for 30 minutes. This priming treatment of the $SiO_2$ microspheres was repeated 10 times before the $SiO_2$ spheres thus coated with a thin Al(OOH) film were autoclaved at 100° C. for 48 hours in a solution of $Ni(NO_3)_2.6H_2O$ and urea. Hollow $SiO_2$—NiAl-LDH microspheres obtained by this process were reported as exhibiting excellent pseudocapacitance performance. Unfortunately, the requirement for the Al(OOH) priming of the $SiO_2$ surface, prior to LDH growth, makes this process unsuitable for use on an industrial scale.

Chen et al, J. Mater. Chem. A, 1, 3877-3880 describes the synthesis of $SiO_2$@MgAl-LDHs having use in the removal of pharmaceutical pollutants from water. The synthesis described comprises coprecipitating LDH from a metal precursor solution containing the $SiO_2$ microspheres followed by ultrasound assisted direct growth of LDH nanosheets on the surface of the $SiO_2$ microspheres. Unfortunately, the reported method does not allow the morphology of the surface LDHs to be tuned and the surface area of the product $SiO_2$@LDHs is not high.

It is an object of the present invention to provide a facile method of making $SiO_2$@LDH microspheres which overcomes drawbacks of the prior art, which in particular does not require a step of initially forming an Al(OOH) film on the $SiO_2$ surface prior to treatment with the metal precursor solution or the requirement for ultrasound assistance in achieving LDH growth on the $SiO_2$ surface. It is also an object of the present invention to provide $SiO_2$@LDHs wherein the thickness, size and morphology of the LDH layer can each be tuned easily for different applications. It is yet a further object of the present invention to provide $SiO_2$@LDHs that have high surface area.

This object is achieved by a method of making silica-layered double hydroxide microspheres having the general formula I

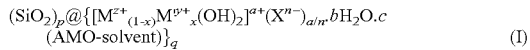

$$(SiO_2)_p@\{[M^{z+}_{(1-x)}M'^{y+}_x(OH)_2]^{a+}(X^{n-})_{a/n}.bH_2O.c(AMO\text{-solvent})\}_q \quad (I)$$

wherein, $M^{z+}$ and $M'^{y+}$ are two different charged metal cations;
z=1 or 2;
y=3 or 4;
0<x<0.9;
b is 0 to 10;
c is 0 to 10;
p>0,
q>0;
$X^{n-}$ is an anion; with n>0 (preferably 1-5)
a=z(1−x)+xy−2; and
the AMO-solvent is an 100% aqueous miscible organic solvent;
which method comprises the steps:
(a) contacting silica microspheres and a metal ion containing solution containing metal ions $M^{z+}$ and $M'^{y+}$ in the presence of a base and anion solution;
(b) collecting the product; and
(c) optionally treating the product with AMO-solvent and recovering the solvent treated material.

According to a further aspect of the invention, there is provided a silica-layered double hydroxide microsphere or a plurality thereof obtained, directly obtained or obtainable by a process defined herein.

A silica-layered double hydroxide microsphere is known to comprise a silica microsphere having solid LDH attached to its surface. Such a material, denoted as $SiO_2$@LDH, may be a core-shell material where the $SiO_2$ microsphere is a solid sphere, a yolk-shell material where the $SiO_2$ microsphere comprises an outer shell and a smaller $SiO_2$ sphere contained within the outer shell wherein there is a hollow portion between the smaller sphere and the inner surface of the outer shell, or a hollow shell material wherein the $SiO_2$ microsphere has a hollow interior.

In an embodiment, the process does not include a step of growing the LDH on the $SiO_2$ surface using ultrasound.

The $SiO_2$ microspheres used in the preparation of the $SiO_2$@LDH microspheres according to the invention may be solid, yolk-shell or hollow microspheres and are commercially-available in a variety of sizes (diameters). However, $SiO_2$ microspheres may be prepared by a modified Stöber process involving ammonia catalysed hydrolysis and condensation of tetraethylorthosilicate using ethanol as solvent and cetyltrimethylammonium bromide as surfactant porogen, as is well known in the art.

In an embodiment, the silica microspheres do not contain any iron.

In another embodiment, the silica microspheres comprise greater than 75% w/w $SiO_2$. Suitably, silica microspheres comprise greater than 85% w/w $SiO_2$. More suitably, the silica microspheres comprise greater than 95% w/w $SiO_2$. Most suitably, the silica microspheres comprise greater than 98% w/w $SiO_2$.

In another embodiment, the silica microspheres consist essentially of $SiO_2$.

In another embodiment, the silica microspheres consist of $SiO_2$.

In another embodiment, the $SiO_2$ microspheres have an average diameter of between 0.15 μm and 8 μm. Suitably, the $SiO_2$ microspheres have an average diameter of between 0.15 μm and 2 μm. More suitably, the $SiO_2$ microspheres have an average diameter of between 0.15 μm and 1 μm. Most suitably, the SiO$_2$ microspheres have an average diameter of between 0.2 μm and 0.8 μm.

The LDH nanosheets grown on the surface of the SiO$_2$ microspheres comprise, and preferably consist of, LDH represented by the general formula I $$[M^{z+}_{1-x}M'^{y+}_{x}(OH)_2]^{a+}(X^{n-})_{a/n} \cdot bH_2O \cdot c(\text{AMO-solvent})  \quad (I),$$

wherein $M^{z+}$ and $M'^{y+}$ are different charged metal cations; z=1 or 2; y=3 or 4; 0<x<0.9; b=0-10; c=0-10, $X^{n-}$ is an anion, n is the charge on the anion, n>0 (preferably 1-5); a=z(1−x)+xy−2; and AMO-solvent is an 100% aqueous miscible organic solvent.

As stated above, $M^{z+}$ and $M'^{y+}$ are different charged metal cations. Having regard to the fact that z=1 or 2, M will be either a monovalent metal cation or a divalent metal cation. When z=1, M is either a single monovalent metal cation or two or more different monovalent metal cations. When z=2, M is either a single divalent metal cation or two or more different divalent metal cations. In an embodiment, z=2, i.e. M is one or more divalent metal cations. M', in view of the fact that y=3 or 4, will be a trivalent metal cation or a tetravalent metal cation. When z=3, M' is either a single trivalent metal cation or two or more different trivalent metal cations. When z=4, M' is either a single tetravalent metal cation or two or more different tetravalent metal cations. In an embodiment, y=3, i.e. M' is one or more trivalent metal cations.

A preferred example of a monovalent metal, for M, is Li. Examples of divalent metals, for M, include Ca, Mg, Zn, Fe, Co, Cu and Ni and mixtures of two or more of these. Preferably, the divalent metal M, if present, is Ca, Ni or Mg. Examples of metals, for M', include Al, Ga, In, Y and Fe. Preferably, M' is a trivalent cation, for example Al. Preferably, the LDH will be a Li—Al, an Mg—Al or a Ca—Al LDH.

The anion $X^{n-}$ in the LDH is any appropriate inorganic or organic anion. Examples of anions that may be used, as $X^{n-}$, in the LDH include carbonate, hydroxide, nitrate, borate, sulphate, phosphate and halide ($F^-$, $Cl^-$, $Br^-$, $I^-$) anions. Preferably, the anion $X^{n-}$, is selected from $CO_3^{2-}$, $NO_3^-$ and $Cl^-$.

The AMO-solvent is any aqueous miscible organic solvent, i.e. a solvent which is 100% miscible with water. Examples of suitable water-miscible organic solvents for use in the present invention include one or more of acetone, acetonitrile, dimethylformamide, dimethylsulfoxide, dioxane, ethanol, methanol, n-propanol, isopropanol, or tetrahydrofuran. Suitably, the water-miscible organic solvents for use in the present invention is selected from lower (1-3C) alkanols and acetone. Preferably, the AMO-solvent is methanol, ethanol or acetone, especially acetone and ethanol.

According to one preferred embodiment, the layered double hydroxides are those having the general formula I above
in which $M^{z+}$ is a divalent metal cation;
$M'^{y+}$ is a trivalent metal cation; and
each of b and c is a number>zero, which gives compounds optionally hydrated with a stoichiometric amount or a non-stoichiometric amount of water and/or an aqueous-miscible organic solvent (AMO-solvent), such as acetone or ethanol.

Preferably, in the LDH of the above formula, M is Mg or Ca and M' is Al. The counter anion $X^{n-}$ is typically selected from $CO_3^{2-}$, $OH^-$, $F^-$, $Cl^-$, $Br^-$, $I^-$, $SO_4^{2-}$, $NO_3^-$ and $PO_4^{3-}$. In a most preferred embodiment, the LDH will be one wherein M is Mg, M' is Al and $X^{n-}$ is $CO_3^{2-}$.

In carrying out the method of the invention, preferably the SiO$_2$ microspheres are dispersed in an aqueous solution containing the desired anion salt, for example Na$_2$CO$_3$. A metal precursor solution, i.e. a solution combining the required monovalent or divalent metal cations and the required trivalent cations may then be added, preferably drop-wise, into the dispersion of the SiO$_2$ microspheres. Preferably, the addition of the metal precursor solution is carried out under stirring. The pH of the reaction solution is preferably controlled within the pH range 8 to 12, typically 8-11, more preferably 9 to 10.

In an embodiment, the method of the present invention does not include ammonia.

The structure of the SiO$_2$@LDH microspheres can be controlled by the tendency of SiO$_2$ to dissolve or partially dissolve at higher temperatures and higher pH values. For instance, carrying out the addition of the metal precursor solution to the dispersion of SiO$_2$ microspheres at room temperature and at pH 10 gives solid SiO$_2$@LDH particles although by raising the temperature of the reaction solutions, for instance to 40° C., it is possible to obtain yolk shell SiO$_2$@LDH particles. By carrying out the reaction at room temperature but using a higher solution pH, e.g. pH 11, it is possible to produce hollow shell SiO$_2$@LDH particles.

Typically, NaOH may be used to adjust the pH of the solution.

During the reaction, the LDH produced from the metal precursor solution reaction is formed on the SiO$_2$ surfaces of the microspheres as nanosheets.

It is preferred that the temperature of the metal ion containing solution in step (a) is within a range of from 20 to 150° C. More preferably, from 20 to 80° C.

In a preferred embodiment, the silica-layered double hydroxide microspheres have specific surface area of at least 100 m$^2$/g, preferably at least 177 m$^2$/g, and more preferably at least 200 m$^2$/g, and even more preferably at least 250 m$^2$/g.

Suitably, the silica-layered double hydroxide microspheres comprise solid silica mircrosphere cores and have specific surface area of at least 100 m$^2$/g.

Suitably, the silica-layered double hydroxide microspheres comprise yolk-shell mircrosphere cores and have specific surface area of at least 100 m$^2$/g.

Suitably, the silica-layered double hydroxide microspheres comprise hollow-shell mircrosphere cores and have specific surface area of at least 130 m$^2$/g.

Most preferred, the silica-layered double hydroxide microspheres have at least one structure from hollow-shell, yolk-shell and solid core-shell structures.

In a preferred embodiment, the silica-layered double hydroxide microspheres have a thickness of layered double hydroxide layer larger than 65 nm, preferably larger than 110 nm, more preferably larger than 160 nm.

The obtained solid product is collected from the aqueous medium. Examples of methods of collecting the solid product include centrifugation and filtration. Typically, the collected solid may be re-dispersed in water and then collected again. Preferably, the collection and re-dispersion steps are repeated twice.

The finally-obtained solid material may then be subjected to drying, for instance, in an oven for several hours.

In the event that a product containing AMO-solvent is required, the material obtained after the collection/re-dispersion procedure described above may be washed with, and preferably also re-dispersed in, the desired solvent, for instance acetone or ethanol. If re-dispersion is employed, the dispersion is preferably stirred. Stirring for more than 2 hours in the solvent is preferable. The final product may then be collected from the solvent and then dried, typically in an oven for several hours.

In an embodiment, the LDH layer is formed in situ. Suitably, the LDH is formed and coated onto the silica microspheres in situ.

The growth of LDH nanosheets on the surface of the $SiO_2$ microspheres is "tuneable". That is to say, by varying the chemistry of the precursor solution, pH of the reaction medium and the rate of addition of the precursor solution to the dispersion of $SiO_2$ microspheres, the extent of, and the length and/or thickness of, the LDH nanosheets formed on the $SiO_2$ surface can be varied.

The production of the $SiO_2$@LDH microspheres according to the invention can be carried out as a batch process or, with appropriate replenishment of reactants, as a continuous process.

The products of the method of the present invention where the $SiO_2$@LDHs are treated with solvent, i.e. the products having the formula I above where c is greater than zero, are a solution to the problem underlying the present invention per se.

Thus, according to a further aspect, the present invention provides silica-layered double hydroxide microspheres having the formula I

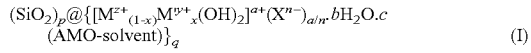
(I)

wherein,
$M^{z+}$ and $M'^{y+}$ are two different charged metal cations;
z=1 or 2;
y=3 or 4;
0<x<0.9;
b is 0 to 10;
c is 0 to 10;
p>0,
q>0;
$X^{n-}$ is an anion; with n>0 (preferably 1-5)
a=z(1−x)+xy−2; and
AMO-solvent is an 100% aqueous miscible organic solvent.
M' in formula I above is preferably Al.
M in formula I above is preferably Li, Mg, Ga, In, Ni, Co, Cu or Ca, more preferably Mg or Ni.

According to an embodiment, $X^{n-}$ in formula I above is selected from carbonate, nitrate, borate, sulphate, phosphate, hydroxide and halide anions ($F^-$, $Cl^-$, $Br^-$, $I^-$). Preferably, the anion $X^{n-}$ is selected from $CO_3^{2-}$, $NO_3^-$ and $Cl^-$.

According to a particularly preferred embodiment, the $SiO_2$@LDH microspheres of the invention contain LDH having the formula I above in which M is Mg, M' is Al and $X^{n-}$ is $CO_3^-$.

The AMO-solvent in formula I above is one that is miscible in water, especially one that is 100% miscible in water. Examples of solvents that can be used include methanol, ethanol and acetone. According to a preferred embodiment of the invention, the solvent is ethanol or acetone.

$SiO_2$@LDHs according to the present invention may be used as catalysts and/or catalyst supports.

PARTICULARLY PREFERRED EMBODIMENTS

The following represent particular embodiments of the silica-layered double hydroxide:

1.1 The silica-layered double hydroxide microspheres have the general formula I

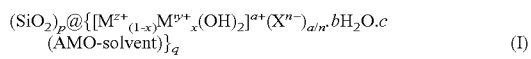
(I)

wherein,
$M^{z+}$ is selected from $Li^+$, $Ca^{2+}$, $Ni^{2+}$ or $Mg^{2+}$, and $M'^{y+}$ is $Al^{3+}$ or $Fe^{3+}$;
0<x<0.9;
b is 0 to 10;
c is 0 to 10;
p>0,
q>0;
$X^{n-}$ is selected from carbonate, hydroxide, nitrate, borate, sulphate, phosphate and halide ($F^-$, $Cl^-$, $Br^-$, $I^-$) anions; with n>0 (preferably 1-5)
a=z(1−x)+xy−2; and
the AMO-solvent is selected from a lower (1-3C) alkanol (e.g. ethanol) or acetone.

1.2 The silica-layered double hydroxide microspheres have the general formula I

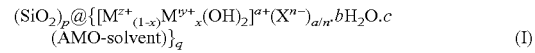
(I)

wherein,
$M^{z+}$ is selected from $Li^+$, $Ca^{2+}$, $Ni^{2+}$ or $Mg^{2+}$, and $M'^{y+}$ is $Al^{3+}$;
0<x<0.9;
b is 0 to 10;
c is 0 to 10;
p>0,
q>0;
$X^{n-}$ is selected from $CO_3^{2-}$, $NO_3^-$ or $Cl^-$; with n>0 (preferably 1-5)
a=z(1−x)+xy−2; and
the AMO-solvent is acetone or ethanol.

1.3 The silica-layered double hydroxide microspheres have the general formula Ia

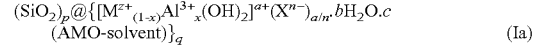
(Ia)

wherein,
$M^{z+}$ is selected from $Li^+$, $Ca^{2+}$, $Ni^{2+}$ or $Mg^{2+}$;
0<x<0.9;
b is 0 to 10;
c is 0 to 10;
p>0,
q>0;
$X^{n-}$ is selected from $CO_3^{2-}$, $NO_3^-$ or $Cl^-$; with n>0 (preferably 1-5)
a=z(1−x)+xy−2; and
the AMO-solvent is acetone or ethanol.

1.4 The silica-layered double hydroxide microspheres have the general formula Ia

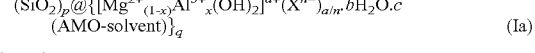
(Ia)

wherein,
0<x<0.9;
b is 0 to 10;
c is 0 to 10;
p>0,
q>0;
$X^{n-}$ is selected from $CO_3^{2-}$, $NO_3^-$ or $Cl^-$; with n>0 (preferably 1-5)
a=z(1−x)+xy−2; and
the AMO-solvent is acetone or ethanol.

1.5 The silica-layered double hydroxide microspheres have the general formula Ib

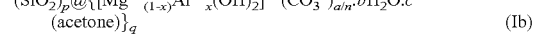
(Ib)

wherein,
0<x<0.9;
b is 0 to 10;
c is 0 to 10;
p>0,
q>0;
a=z(1−x)+xy−2.

1.6 The silica-layered double hydroxide microspheres have the general formula Ic

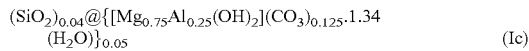

$(SiO_2)_{0.04}@\{[Mg_{0.75}Al_{0.25}(OH)_2](CO_3)_{0.125}\cdot 1.34(H_2O)\}_{0.05}$ (Ic)

1.7 The silica-layered double hydroxide microspheres have the general formula Id

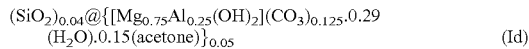

$(SiO_2)_{0.04}@\{[Mg_{0.75}Al_{0.25}(OH)_2](CO_3)_{0.125}\cdot 0.29(H_2O)\cdot 0.15(acetone)\}_{0.05}$ (Id)

Preferred, suitable, and optional features of any one particular aspect of the present invention are also preferred, suitable, and optional features of any other aspect.

FIGURES

FIG. 1. XRD patterns showing three sizes of silica nanoparticles (a) 300 nm, (b) 550 nm and (c) 800 nm.

Figure 2:
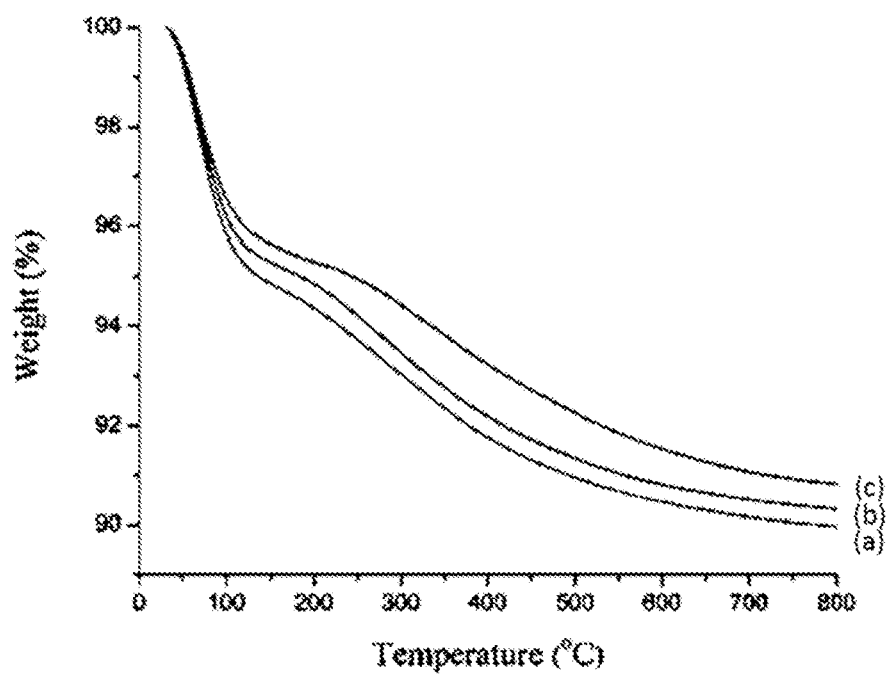

FIG. 2. TGA curves of differently sized silica nanoparticles (a) 800 nm, (b) 550 nm and (c) 300 nm.

Figure 3:
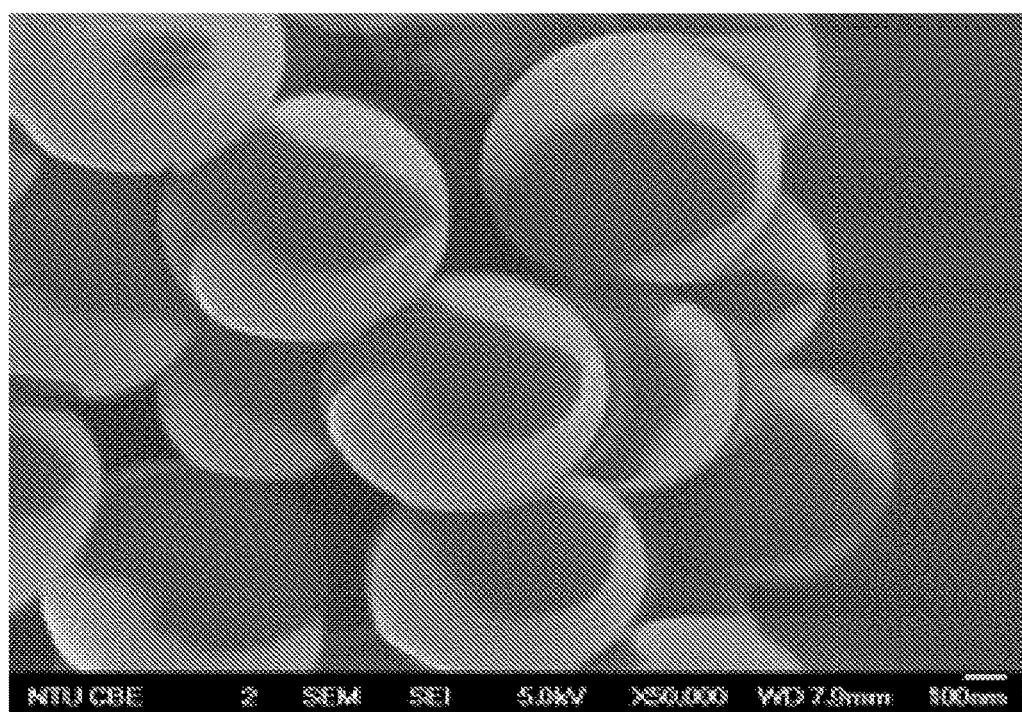

FIG. 3. SEM images of 800 nm silica microspheres prepared via seeded growth.

Figure 4:
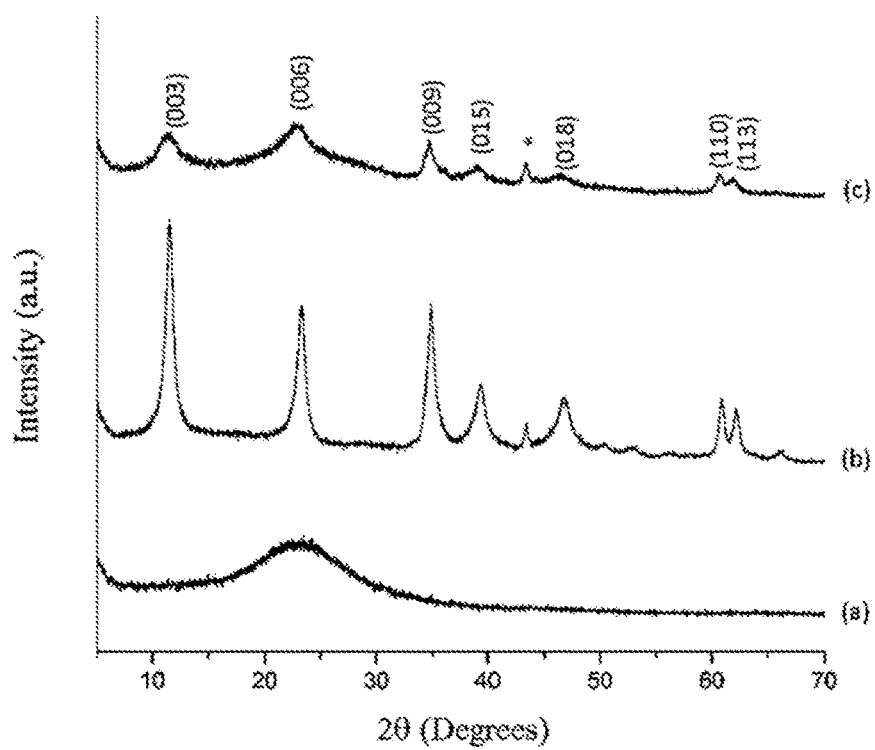

FIG. 4. XRD patterns of (a) 550 nm silica microspheres, (b) LDH nano-particles and (c) $SiO_2$@LDH microspheres ((b) and (c) were synthesized according to example 1).

Figure 5:
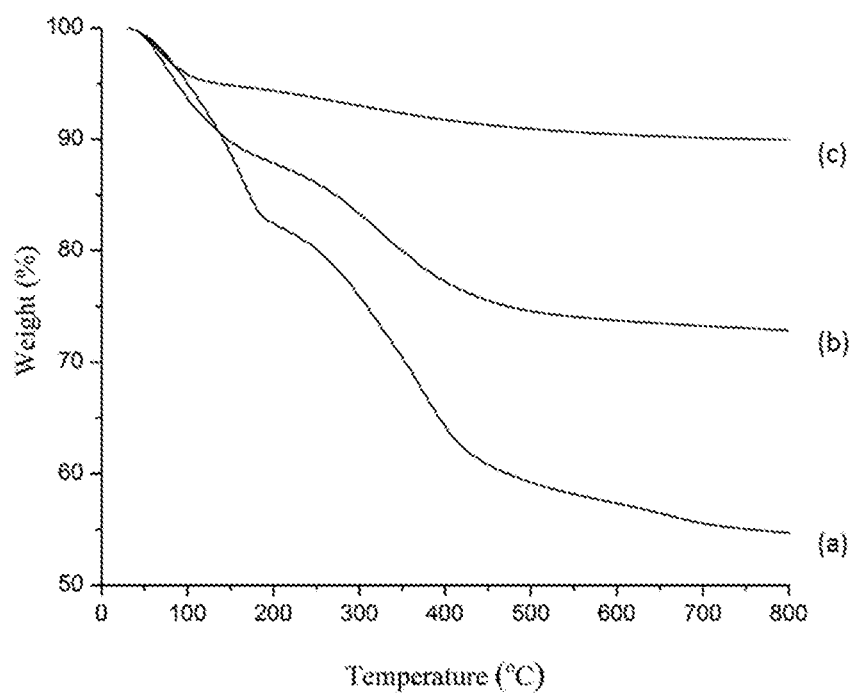

FIG. 5. Percentage weight loss of (a) LDH, (b) $SiO_2$@LDH microspheres and (c) silica nanoparticles ((a) and (b) were synthesized according to example 1).

Figure 6:
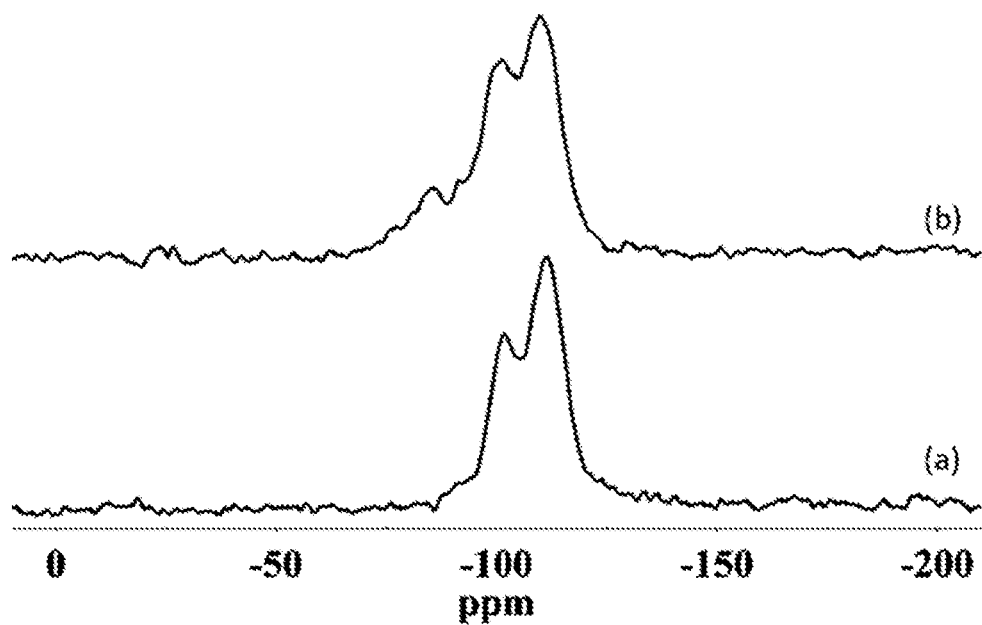

FIG. 6. $^{29}Si$ Solid-state NMR of (a) silica microspheres and (b) $SiO_2$@LDH microspheres ((b) were synthesized according to example 1).

Figure 7:
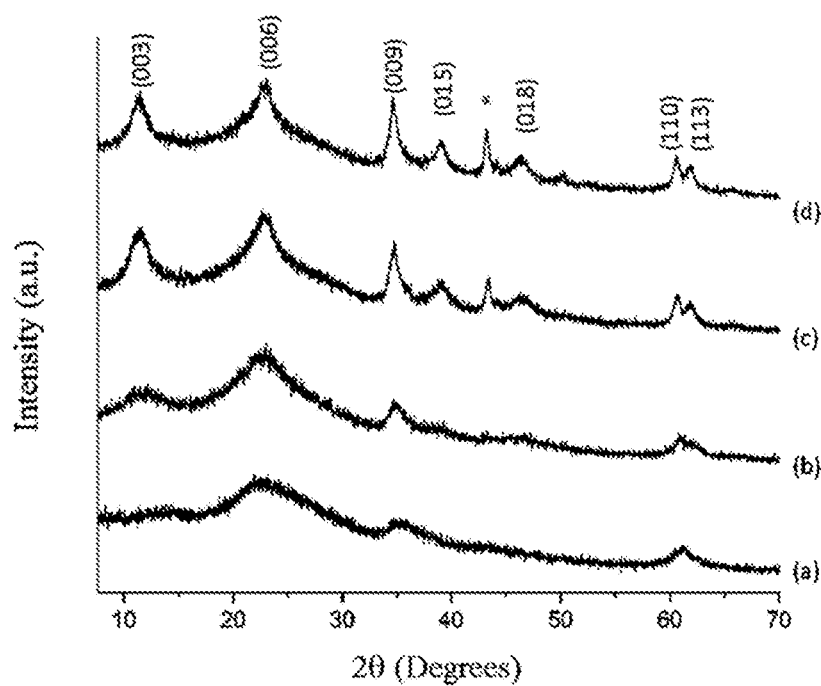

FIG. 7. XRD patterns of $SiO_2$@LDH microspheres prepared at different pH conditions (a) ammonia method (example 4), (b) pH 9, (c) pH 10 and (d) pH 11 ((b)-(d): example 1).

Figure 8:
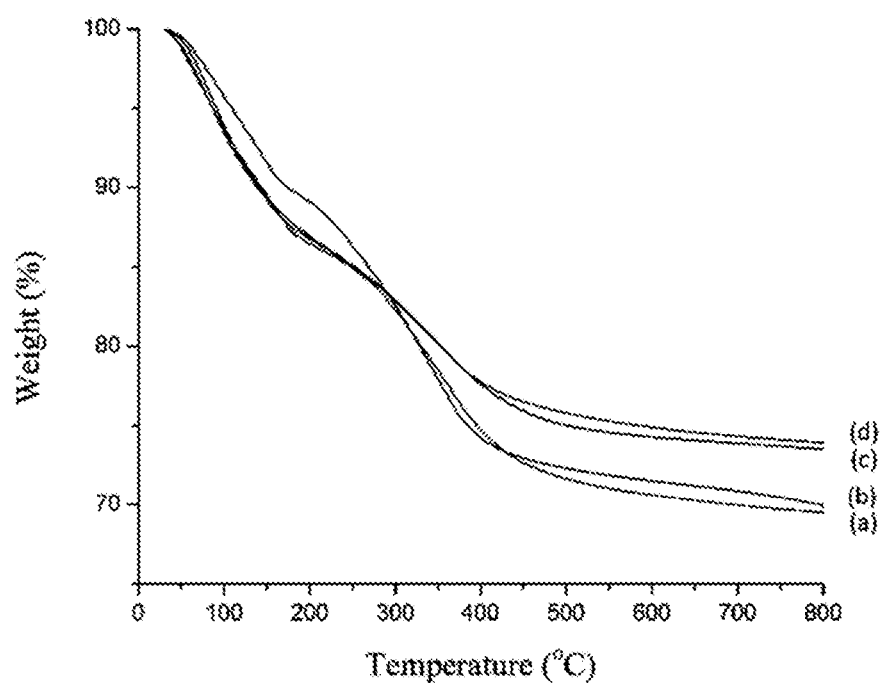

FIG. 8. TGA of $SiO_2$@LDH microspheres prepared at different pH conditions (a) pH 11, (b) pH 10, (c) ammonia method and (d) pH 9.

Figure 9:
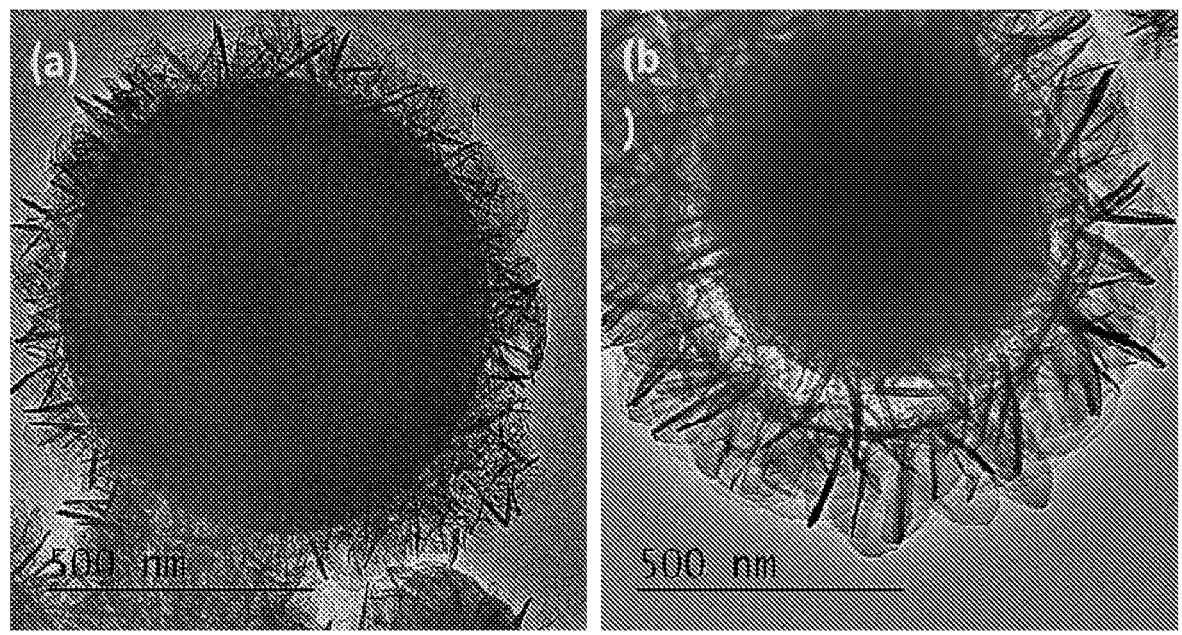

FIG. 9. TEM images of $SiO_2$@LDH microspheres synthesized according to example 1 except at different temperatures (a) room temperature (b) 40° C.

Figure 10:
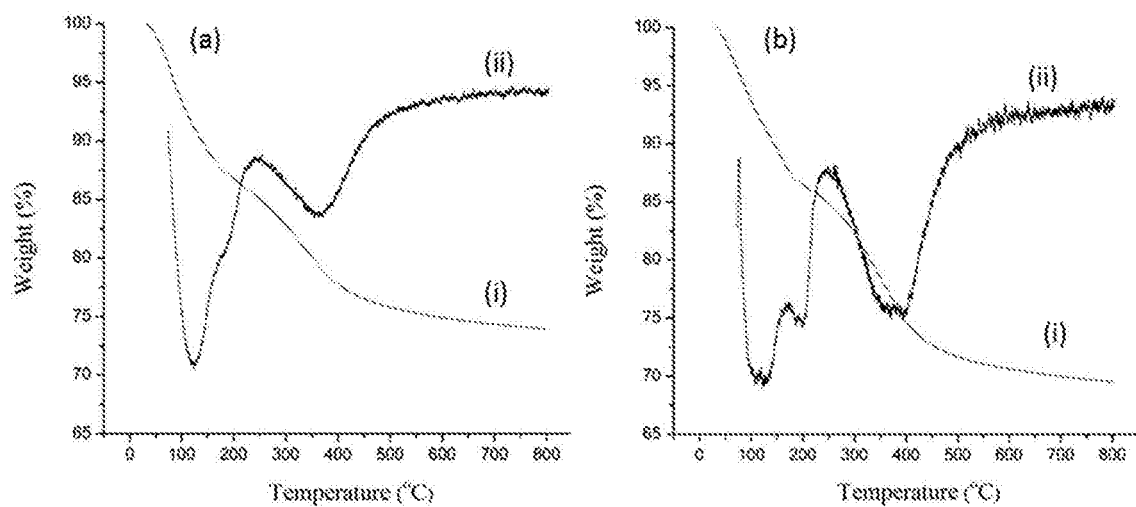

FIG. 10. TGA and dTGA curves of $SiO_2$@LDH microspheres prepared according to example 1 except at different temperature (a) room temperature and (b) 40° C., (i) TGA curve, (ii) dTGA curve.

Figure 11:
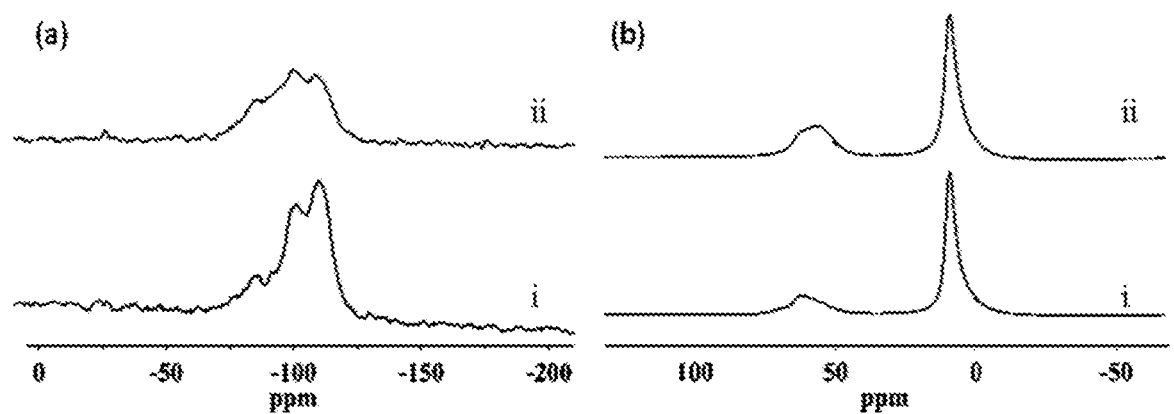

FIG. 11. Solid state NMR (a) $^{29}Si$ (b) $^{27}Al$. $SiO_2$.@ LDH prepared according to example 1 except at different temperature (i) at room temperature (ii) at 40° C.

Figure 12:
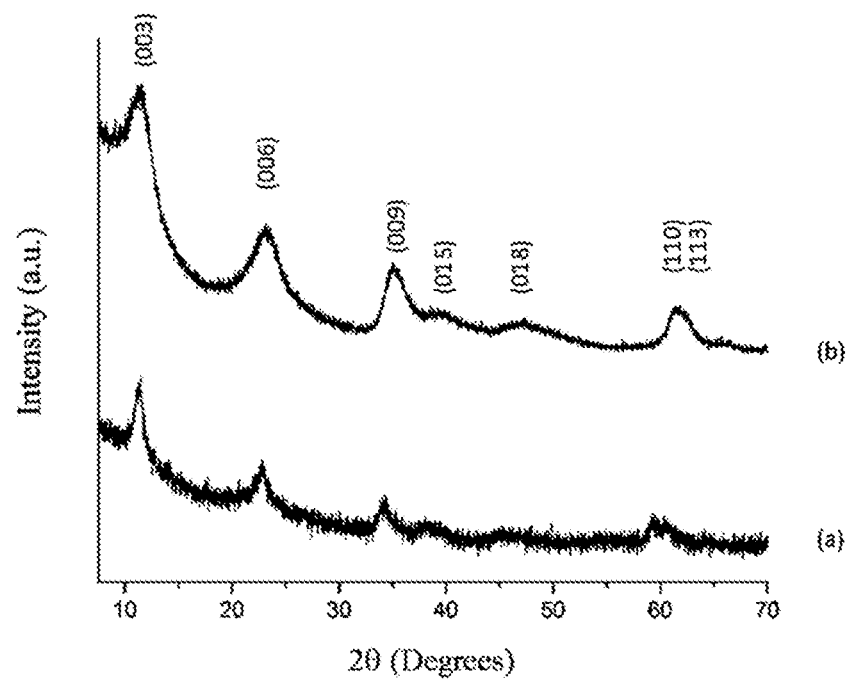

FIG. 12. XRD patterns of $SiO_2$@LDH microspheres prepared with different Mg:Al ratios (a) 1:1 (example 2), (b) 3:1 (example 3).

Figure 13:
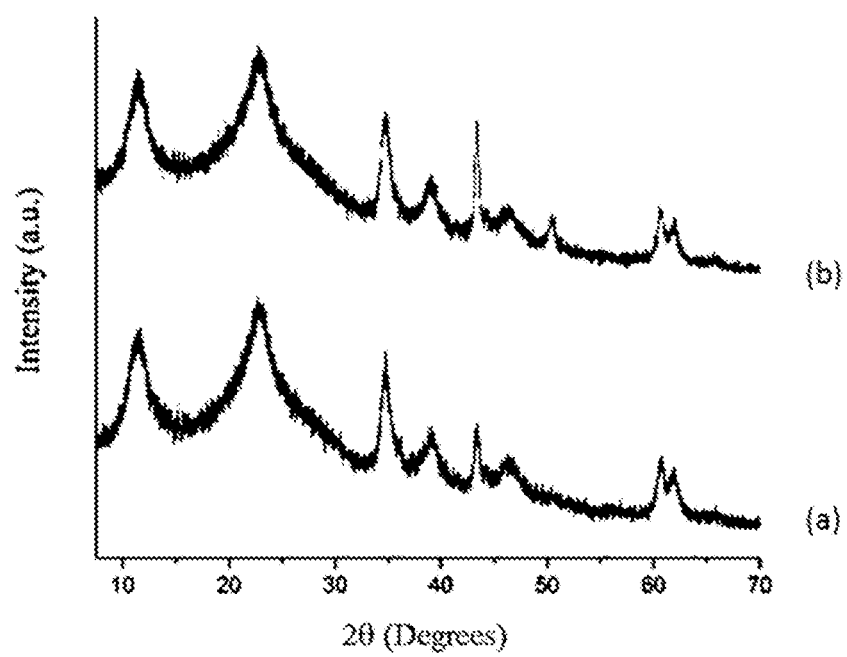

FIG. 13. XRD patterns of $SiO_2$@LDH microspheres prepared according to example 1 (a) conventional water washing (b) acetone washing.

Figure 14:
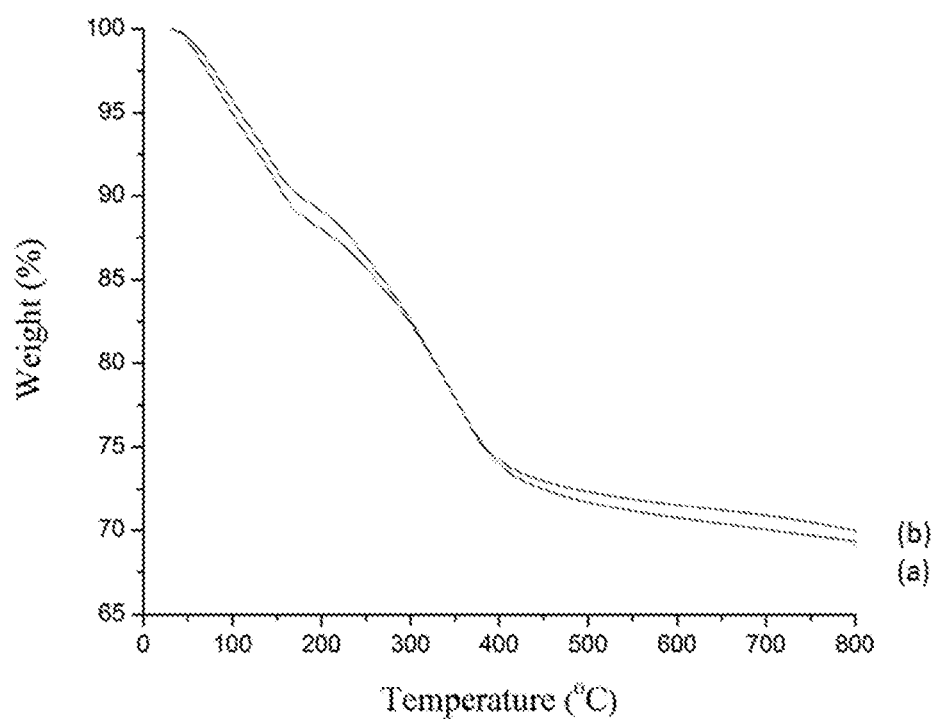

FIG. 14. TGA of $SiO_2$@LDH microspheres prepared according to example 2 (a) conventional water washing (b) acetone washing.

Figure 15:
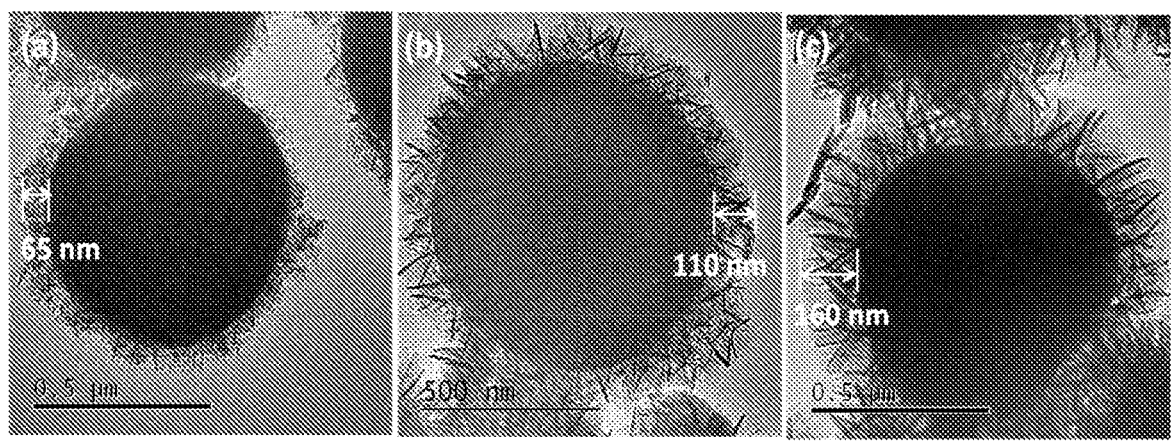

FIG. 15. TEM image of $SiO_2$@LDH microspheres with different ratio of Mg/Al (a) 1:1 (example 2), (b) 2:1 (example 1) and (c) 3:1 (example 3).

Figure 16:
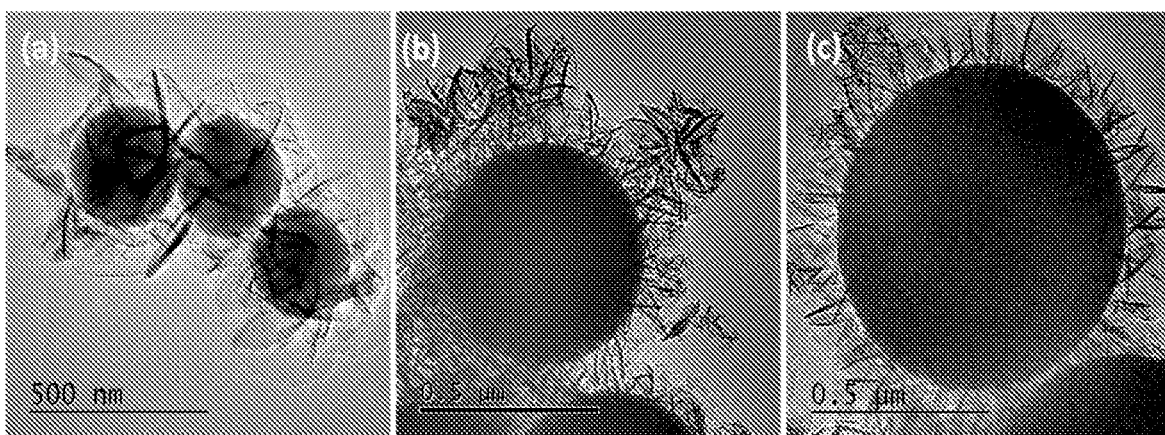

FIG. 16. TEM image of $SiO_2$@LDH microspheres according to example 1 except with different size of silica (a) 300 nm, (b) 550 nm and (c) 800 nm.

Figure 17:
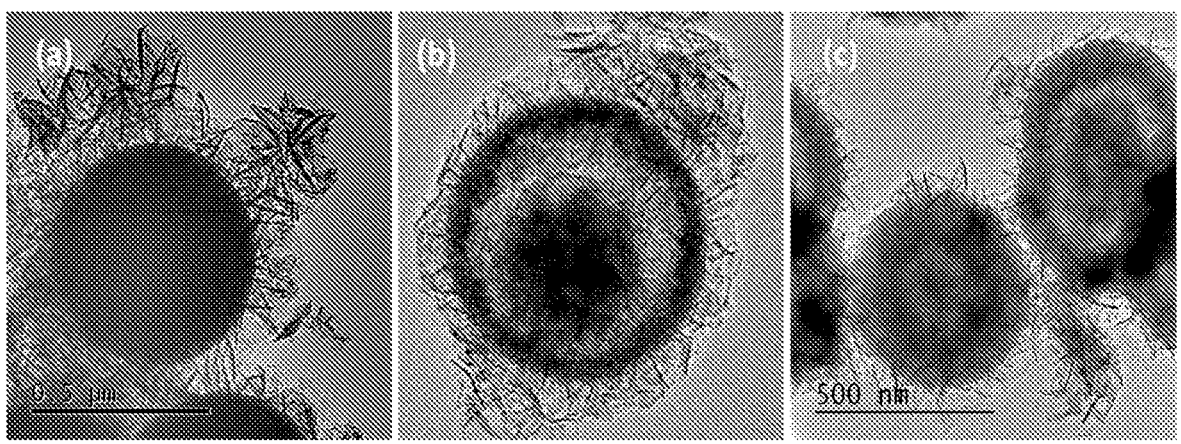

FIG. 17. TEM image of $SiO_2$@LDH microspheres with different morphology (a) solid (example 1), (b) yolk-shell (example 1 at 40° C.) and (c) hollow (example 1 at pH 11).

Figure 18:
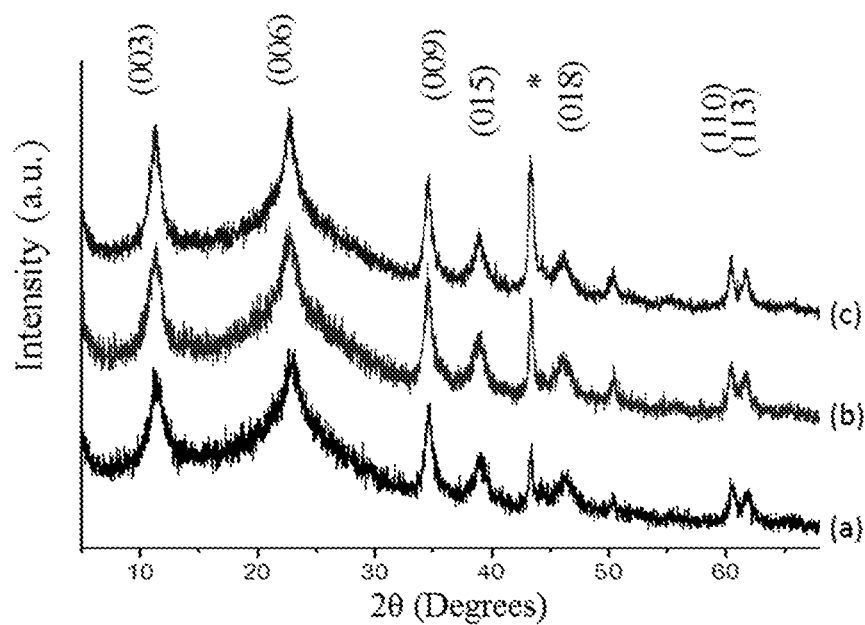

FIG. 18. XRD patterns of $SiO_2$@AMO-LDH with an Mg:Al=3:1 (a) pH=10 and room temperature (b) pH=10 and 40° C. (c) pH=11 and 40° C.

Figure 19:
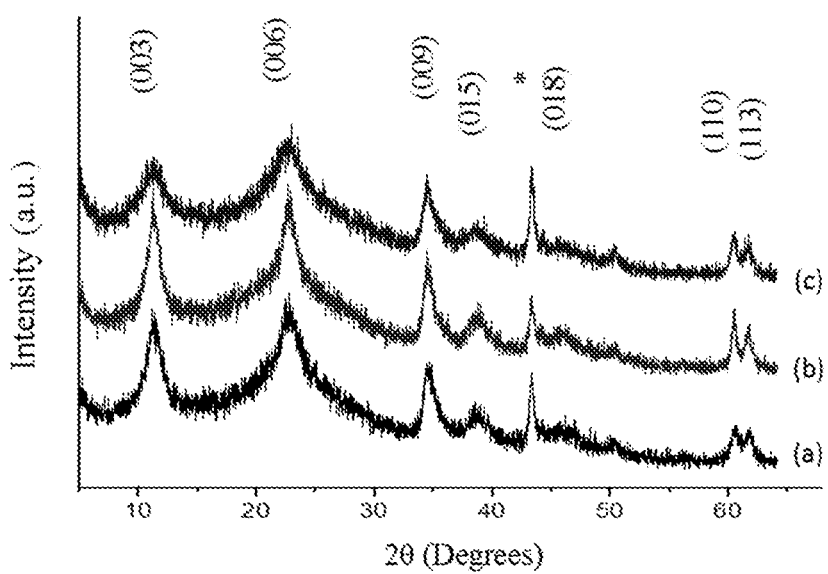

FIG. 19. XRD patterns of $SiO_2$@AMO-LDH with Mg:Ni:Al=2.7:0.3:1 (a) pH=10 and room temperature (b) pH=10 and 40° C. (c) pH=11 and 40° C.

Figure 20:
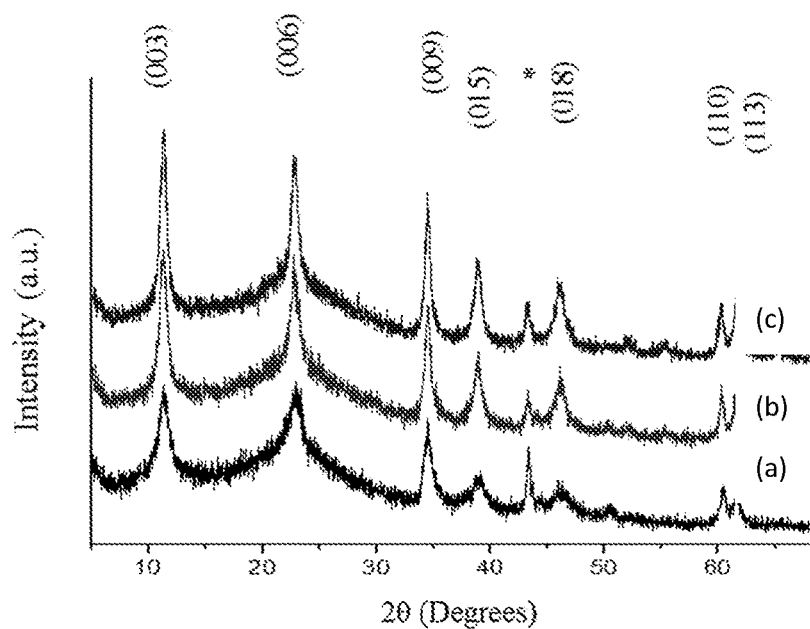
Figure 21:
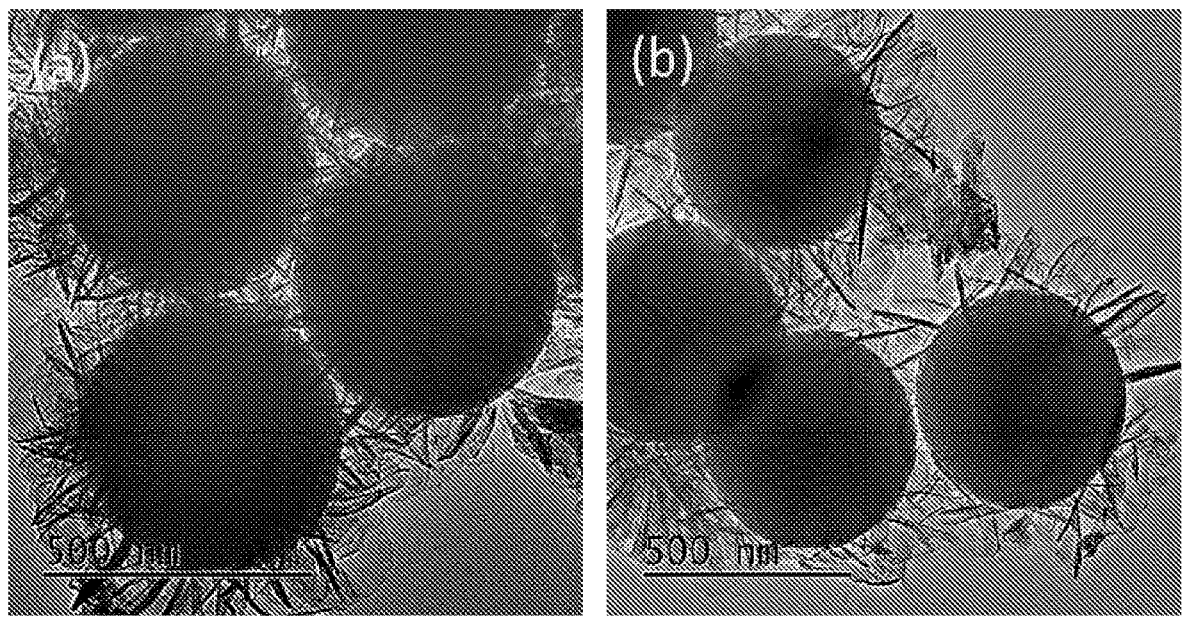

FIG. 20. XRD patterns of $SiO_2$@AMO-LDH with an Mg:Al:Fe=3:0.9:0.1 (a) pH=10 and room temperature (b) pH=10 and 40° C. (c) pH=11 and 40° C.;

FIG. 21. TEM image of $SiO_2$@AMO LDH microspheres according to examples 5 and 7 at pH=10 and room temperature (a) Mg:Al=3:1 (b) Mg:Al:Fe=3:0.9:0.1.

Figure 22:
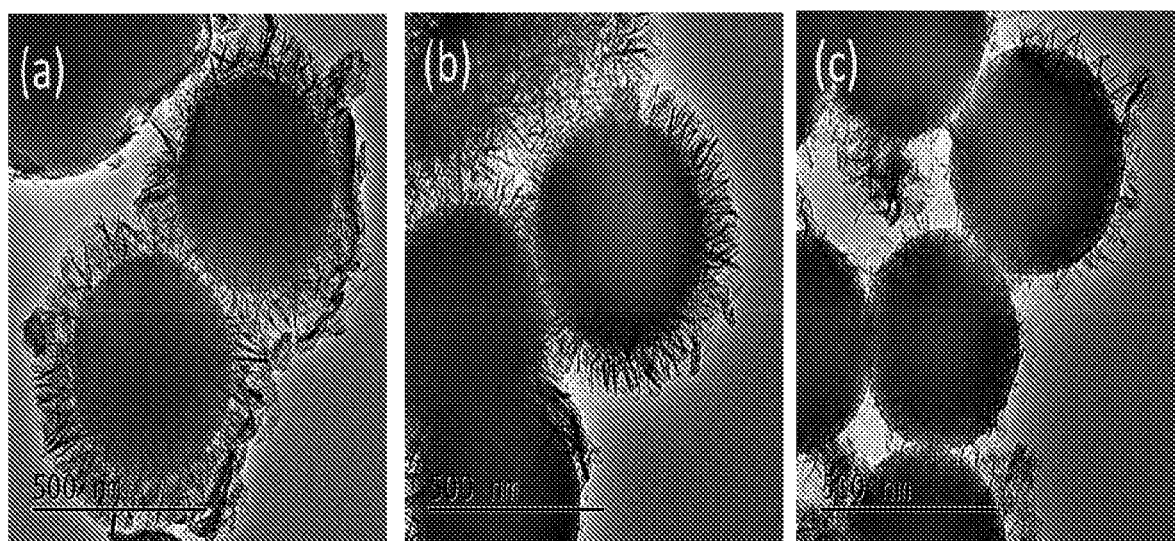

FIG. 22. TEM image of $SiO_2$@AMO-LDH with Mg:Ni:Al=2.7:0.3:1 microspheres with different morphology according to example 6 (a) pH=10 and room temperature (b) pH=10 and 40° C. (c) pH=11 and 40° C.

EXPERIMENTAL METHODS

1. General Details
1.1 Powder X-Ray Diffraction

Powder X-ray diffraction (XRD) data were collected on a PANAnalytical X'Pert Pro diffractometer in reflection mode and a PANAnalytical Empyrean Series 2 at 40 kV and 40 mA using Cu Kα radiation (α1=1.54057 Å, α2=1.54433 Å, weighted average=1.54178 Å). Scans were recorded from $5°\le\theta\le 70°$ with varying scan speeds and slit sizes. Samples were mounted on stainless steel sample holders. The peaks at 43-44° are produced by the XRD sample holder and can be disregarded.

1.2 Thermogravimetric Analysis

Thermogravimetric analysis (TGA) measurements were collected using a Netzsch STA 409 PC instrument. The sample (10-20 mg) was heated in a corundum crucible between 30° C. and 800° C. at a heating rate of 5° C. min-1 under a flowing stream of nitrogen.

1.3 Solid State NMR Spectroscopy $^{29}Si$ and $^{27}Al$ MAS NMR spectra were recorded on a Varian Chemagnetics CMX Infinity 200 (4.7 T). Samples were packed in 7.5 mm zirconia rotors. A double resonance MAS probe was used for all measurements and a MAS rate of 4 kHz for $^{29}Si$, whereas MAS rate of 6 kHz was used for $^{27}Al$. $^{27}Al$ MAS NMR spectra were acquired with a single pulse excitation applied using a short pulse length (0.7 µs). Each spectrum resulted from 2000 scans separated by 1 s delay. The $^{27}Al$ chemical shifts are referenced to an aqueous solution of $Al(NO_3)_3$ (δ=0 ppm). In order to obtain the quantitative $^{29}Si$ DPMAS NMR spectra, 5000 transients were typically acquired with an acquisition time of 68 ms (1024 data points zero filled to 16K) and recycle delay of 30 s. All $^{29}Si$ spectra were externally referenced to kaolinite (taken to be at δ=−91.7 ppm on a scale where δ(TMS)=0 ppm) as a secondary reference.

1.4 Transmission Electron Microscopy

Transmission Electron Microscopy (TEM) analysis was performed on a JEOL 2100 microscope with an accelerating voltage of 200 kV. Particles were dispersed in water or ethanol with sonication and then cast onto copper grids coated with carbon film and left to dry.

1.5 Scanning Electron Microscopy

Scanning Electron Microscopy (SEM) analysis was performed on a JEOL JSM 6610 scanning electron microscope. Particles were dispersed in water and cast onto a clean silica wafer. Before imaging, the samples were coated with a thin platinum layer to prevent charging and to improve the image quality. Energy dispersive X-ray spectroscopy (EDX), also carried out on this instrument, was used to determine the relative quantities of constituent elements on the surface of the sample.

1.6 Brunauer-Emmett-Teller Surface Area Analysis

Brunauer-Emmett-Teller (BET) specific surface areas were measured from the $N_2$ adsorption and desorption isotherms at 77 K collected from a Quantachrome Autosorb surface area and pore size analyser.

Example 1

Silica spheres (100 mg, 550 nm) were dispersed in deionised water (20 mL) using ultrasound treatment. After 30 min., $Na_2CO_3$ (0.96 mmol) was added to the solution and a further 5 min of sonication was carried out to form solution A. Next an aqueous solution (19.2 mL) containing Mg$(NO_3)_2 \cdot 6H_2O$ (0.96 mmol) and Al$(NO_3)_3 \cdot 9H_2O$ (0.48 mmol) was added at a rate of 60 mL/h to solution A under vigorous stirring at room temperature. The pH of the reaction solution was controlled to be 10 with the addition of 1 M NaOH. The obtained solid was collected with centrifugation at 4000 rpm for 5 min and then re-dispersed in deionised water (40 mL) and stirred for 1 h. The collection and re-dispersion were repeated twice. Afterward, the solid was washed with acetone (40 mL) and then re-dispersed in acetone (40 mL) and left to stir overnight. The solid was then dried under vacuum.

The $SiO_2$@LDH obtained in this Example, before the treatment with acetone, has the formula:—

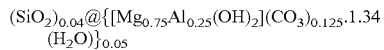

$$(SiO_2)_{0.04}@\{[Mg_{0.75}Al_{0.25}(OH)_2](CO_3)_{0.125} \cdot 1.34(H_2O)\}_{0.05}$$

The $SiO_2$@AMO-LDH, obtained after acetone treatment, has the formula:—

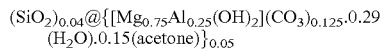

$$(SiO_2)_{0.04}@\{[Mg_{0.75}Al_{0.25}(OH)_2](CO_3)_{0.125} \cdot 0.29(H_2O) \cdot 0.15(\text{acetone})\}_{0.05}$$

Yolk shell particles were obtained by carrying out the addition of the aqueous solution containing the Mg$(NO_3)_2 \cdot 6H_2O$ and Al$(NO_3)_3 \cdot 9H_2O$ at 40° C. and pH10.

Hollow shell particles were obtained by carrying out the addition of the aqueous solution containing Mg$(NO_3)_2 \cdot 6H_2O$ and Al$(NO_3)_3 \cdot 9H_2O$ at room temperature but at pH11.

Surface Area Analysis

The solid $SiO_2$@LDH, the yolk shell $SiO_2$@LDH and the hollow shell $SiO_2$@LDH prepared as described above but without acetone treatment were subjected to Brunauer-Emmett-Teller (BET) surface area analysis.

The $N_2$ BET surface areas of the products were:

| | BET surface area ($m^2 g^{-1}$) |
|---|---|
| Solid (i.e. core-shell) $SiO_2$@LDH | 107 |
| Yolk-shell $SiO_2$@LDH | 118 |
| Hollow-shell $SiO_2$@LDH | 177 |

The BET surface areas reported above may be favourably compared to those of $SiO_2$@LDHs prepared according to (A) Shao et al. Chem. Mater. 2012, 24, pages 1192-1197 and to those of $SiO_2$@LDHs prepared according to (B) Chen et al. J. Mater. Chem. A, 1, 3877-3880.

| | | BET surface area ($m^2 q^{-1}$) |
|---|---|---|
| (A) | $SiO_2$ microspheres pre-treated with Al(OOH). Product $SiO_2$@NiAl LDH. | |
| | Solid (i.e. core-shell) $SiO_2$ microspheres | 42.3 |
| | Yolk-shell $SiO_2$@LDH microspheres | 68 |
| | Hollow-shell $SiO_2$@LDH microspheres | 124 |
| (B) | $SiO_2$ microspheres-no pre-treatment-ammonia method. Product $SiO_2$@LDH. | |
| | Solid (i.e. core-shell) $SiO_2$@LDH microspheres | 61 |

Core-shell $SiO_2$@LDHs were prepared according to the procedures described in Example 1 and in the Examples 2 and 3 below having different thicknesses of LDH layer. The ratio of Mg/Al was varied to control the thickness of the LDH layer. A Mg:Al ratio of 1:1 was found to give an LDH layer of thickness 65 nm, a ratio of 2:1 was found to give an LDH layer of thickness 110 nm and a layer of thickness of 160 nm was obtained using a Mg:Al ratio of 3:1. TEM images are shown in FIG. 15. Core-shell $SiO_2$@LDHs were also prepared according to the procedure described in Example 1 above using different sized $SiO_2$ microspheres, 300 nm, 550 nm and 800 nm. TEM images are shown in FIG. 16. TEM images of the $SiO_2$@LDHs produced with different morphology (a) solid (Example 1), (b) yolk shell (Example 1 at 40° C.) and (c) hollow (Example 1 at pH11), as described above, are shown in FIG. 17.

Example 2

In order to obtain a 1:1 Mg:Al LDH, the procedure described above in Example 1 was repeated with the exception that an aqueous solution (19.2 mL) containing Mg$(NO_3)_2 \cdot 6H_2O$ (0.72 mmol) and Al$(NO_3)_3 \cdot 9H_2O$ (0.72 mmol) was added at a rate of 60 mL/h to solution A under vigorous stirring.

Example 3

In order to obtain a 3:1 Mg:Al LDH, the procedure described above in Example 1 was repeated with the exception that an aqueous solution (19.2 mL) containing Mg$(NO_3)_2 \cdot 6H_2O$ (1.08 mmol) and Al$(NO_3)_3 \cdot 9H_2O$ (0.36 mmol) was added at a rate of 60 mL/h to solution A under vigorous stirring. The XRD patterns of the $SiO_2$@LDH samples prepared with Mg:Al ratios of 1:1 (Example 2) and 3:1 (Example 3) are shown in FIG. 12.

Example 4

The silica@LDH particles were synthesised via the coprecipation method. Silica spheres (100 mg, 550 nm) were dispersed in deionised water (20 mL) using ultrasound treatment. After 30 min, the anion salt (0.96 mmol), $Na_2CO_3$, was added to the solution containing ammonia (0.8 mL, 35%) and a further 5 min of sonication was carried out to form solution A. Next an aqueous solution (19.2 mL) containing Mg$(NO_3)_2 \cdot 6H_2O$) (0.96 mmol) and Al$(NO_3)_3 \cdot 9H_2O$ (0.48 mmol) was added at a rate of 60 mL/h to solution A under vigorous stirring. The obtained solid was collected with centrifugation at 4000 rpm for 5 min and then re-dispersed in deionised water (40 mL) and stirred for 1 h. The collection and re-dispersion were repeated twice. Afterward, the solid was washed with acetone (40 mL) and then re-dispersed in acetone (40 mL) and left to stir overnight.

The solid was then dried under vacuum. The suspension was then dried under vacuum for materials characterisation.

The features disclosed in the foregoing description, in the claims as well as in the accompanying drawings, may both separately and in any combination thereof be material for realizing the invention in diverse forms thereof.

Example 5

In order to obtain Silica@AMO-LDHs in Mg:Al=3:1. Synthesise the Silica@LDH particles by using the co-precipitation method, disperse silica spheres (100 mg) in the deionised water (20 mL) by using ultrasound treatment for 30 min, add the anion salt $Na_2CO_3$ (0.96 mmol) in the solution and further treat by ultrasound for 5 min, the finally solution named A. Then add an aqueous solution (19.2 mL) containing (1.08 mmol) $Mg^{2+}$ and (0.36 mmol) $Al^{3+}$ in the solution A at the rate of 60 mL/h with vigorous stirring. The pH of the reaction solution is controlled with the addition of 1 M NaOH by an autotitrator. And the morphology of Silica@LDH is controlled by pH and temperature. The obtained solid is collected with centrifugation at 5000 rpm for 5 min and then re-dispersed in deionised water (40 mL) and stir for 1 h, the washing need repeated twice. Before final isolation, the solid is washed with acetone (40 mL) and left to stir over night, and the suspension is then dried under vacuum Example 6

In order to obtain Silica@AMO-LDHs in Mg:Ni:Al=2.7:0.3:1. The Silica@LDH particles will be synthesized by using the co-precipitation method, disperse silica spheres (100 mg) in the deionised water (20 mL) by using ultrasound treatment for 30 min, add the anion salt $Na_2CO_3$ (0.96 mmol) in the solution and further treat by ultrasound for 5 min, the finally solution named A. Then add an aqueous solution (19.2 mL) containing (0.972 mmol) $Mg^{2+}$, (0.108 mmol) $Ni^{2+}$ and (0.36 mmol) $Al^{3+}$ in the solution A at the rate of 60 mL/h with vigorous stirring. The pH of the reaction solution is controlled with the addition of 1 M NaOH by an autotitrator. As followed the morphology of Silica@LDH is controlled by pH and temperature. The obtained solid is collected with centrifugation at 5000 rpm for 5 min and then re-dispersed in deionised water (40 mL) and stir for 1 h, the washing need repeated twice. Before final isolation, the solid is washed with acetone (40 mL) and left to stir over night, and the suspension is then dried under vacuum.

Example 7

In order to obtain Silica@AMO-LDHs in Mg:Al:Fe=3:0.9:0.1. The Silica@LDH particles synthesise using the co-precipitation method, disperse silica spheres (100 mg) in the deionised water (20 mL) by using ultrasound treatment for 30 min, add the anion salt $Na_2CO_3$ (0.96 mmol) in the solution and further treat by ultrasound for 5 min, the finally solution named A. Then add an aqueous solution (19.2 mL) containing (1.08 mmol) $Mg^{2+}$, (0.324 mmol) $Al^{3+}$ and (0.036 mmol) $Fe^{3+}$ in the solution A at the rate of 60 mL/h with vigorous stirring. The pH of the reaction solution is controlled with the addition of 1 M NaOH by an autotitrator. As followed the morphology of Silica@LDH is controlled by pH and temperature. The obtained solid is collected with centrifugation at 5000 rpm for 5 min and then re-dispersed in deionised water (40 mL) and stir for 1 h, the washing need repeated twice. Before final isolation, the solid is washed with acetone (40 mL) and left to stir over night, and the suspension is then dried under vacuum

The invention claimed is:

1. A method of making silica-layered double hydroxide microspheres, each having a silica microsphere core and a layered double hydroxide coating on the surface of the silica microsphere core, the silica-layered double hydroxide microspheres having the formula I $$(SiO_2)_p@\{[M^{z+}_{(1-x)}M'^{y+}_{x}(OH)_2]^{a+}(X^{n-})_{a/n}.bH_2O.c(AMO\text{-solvent})\}_q \quad (I)$$

wherein,
$M^{z+}$ and $M'^{y+}$ are two different charged metal cations;
z=1 or 2;
y=3 or 4;
0<x<0.9;
b is 0 to 10;
c is 0 to 10;
p>0,
q>0,
$X^{n-}$ is an anion; with n>0
a=z(1-x)+xy-2; and
the AMO-solvent is an 100% aqueous miscible organic solvent;

which method comprises the steps:
(a) contacting:
(i) silica microspheres,
(ii) a metal ion containing solution containing metal ions $M^{z+}$ and $M'^{y+}$, and
(iii) an anion solution
in the presence of a base to grow a layered double hydroxide coating on the surface of the silica microspheres;
(b) collecting the product; and
(c) optionally treating the product with AMO-solvent and recovering the solvent treated material to obtain the silica-layered double hydroxide microspheres;
wherein the pH of the reaction solution formed in step (a) is controlled within a range from 8 to 12;
and wherein the silica-layered double hydroxide microspheres have a thickness of layered double hydroxide of larger than 110 nm.

2. The method according to claim 1, wherein M' is one or more trivalent metal cations.

3. The method according to claim 1, wherein M is one or more divalent metal cations.

4. The method according to claim 1, wherein $X^{n-}$ is selected from $CO_3^{2-}$, $OH^-$, $F^-$, $Cl^-$, $Br^-$, $I^-$, $SO_4^{2-}$, $NO_3^-$ and $PO_4^{3-}$, or a mixture thereof.

5. The method according to claim 1, wherein M is Mg, M' is Al and $X^{n-}$ is $CO_3^{2-}$.

6. The method according to claim 1, wherein the pH is controlled within a range from 9 to 10.

7. The method according to claim 1, wherein the product collected in step (b) is dispersed in the AMO-solvent and wherein c in the formula I has a value which is greater than zero and up to 10.

8. The method according to claim 7, wherein the dispersion of the product in the AMO-solvent is maintained for 2 or more hours and then the treated material is separated from the solvent.

9. The method according to claim 1, wherein the AMO-solvent is acetone, ethanol or methanol or a mixture thereof.

10. The method according to claim 1, wherein the temperature of the metal ion containing solution in step (a) is within a range of from 20 to 150° C.

11. The method according to claim 10, wherein the temperature is from 20 to 80° C.

12. The method of claim 1, wherein the silica-layered double hydroxide microspheres have specific surface area as determined by $N_2$ BET of at least 177 $m^2/g$.

13. The method of claim 1, wherein the silica-layered double hydroxide microspheres have at least one structure from hollow-shell, yolk-shell and solid core-shell structures.

14. The method of claim 1, wherein step (a) comprises:
 dispersing the silica microspheres in an aqueous solution containing a salt of the anion, thereby forming a dispersion; and
 adding the metal ion containing solution containing metal ions $M^{z+}$ and $M^{y+}$ to the dispersion, with stirring.

* * * * *